United States Patent
Flowers et al.

(10) Patent No.: US 7,505,423 B2
(45) Date of Patent: *Mar. 17, 2009

(54) TELEPHONE CONFERENCING SYSTEM AND METHOD

(75) Inventors: Jeffry C Flowers, Marblehead, MA (US); James J Koschella, Somerville, MA (US)

(73) Assignee: Sonexis, Inc., Tewksbury, MA (US)

( * ) Notice: Subject to any disclaimer, the term of this patent is extended or adjusted under 35 U.S.C. 154(b) by 1201 days.

This patent is subject to a terminal disclaimer.

(21) Appl. No.: 10/218,761

(22) Filed: Aug. 14, 2002

(65) Prior Publication Data

US 2003/0161314 A1    Aug. 28, 2003

Related U.S. Application Data

(60) Provisional application No. 60/359,364, filed on Feb. 25, 2002.

(51) Int. Cl.
*H04L 12/16* (2006.01)
(52) U.S. Cl. ............... 370/260; 379/202.01; 348/14.08; 455/414.1
(58) Field of Classification Search ........... None
See application file for complete search history.

(56) References Cited

U.S. PATENT DOCUMENTS

| | | | |
|---|---|---|---|
| 5,724,416 A * | 3/1998 | Foladare et al. ........ | 379/202.01 |
| 5,764,916 A | 6/1998 | Busey et al. ........... | 395/200.57 |
| 5,818,836 A | 10/1998 | DuVal .................... | 370/389 |
| 5,859,979 A * | 1/1999 | Tung et al. ............... | 709/228 |
| 5,862,330 A | 1/1999 | Anupam et al. ........ | 395/200.34 |
| 5,884,032 A | 3/1999 | Bateman et al. ........ | 395/200.34 |
| 5,916,302 A | 6/1999 | Dunn et al. ............... | 709/204 |
| 5,963,217 A | 10/1999 | Grayson et al. .......... | 345/473 |
| 5,974,446 A | 10/1999 | Sonnenreich et al. ...... | 709/204 |
| 6,108,687 A | 8/2000 | Craig ....................... | 709/203 |
| 6,138,144 A | 10/2000 | DeSimone et al. ......... | 709/204 |
| 6,148,068 A | 11/2000 | Lowery et al. .......... | 379/202.01 |
| 6,167,432 A | 12/2000 | Jiang ........................ | 709/204 |
| 6,173,314 B1 | 1/2001 | Kurashima et al. ......... | 709/204 |
| 6,266,328 B1 | 7/2001 | Johnson, Jr. et al. ....... | 370/260 |
| 7,007,098 B1 * | 2/2006 | Smyth et al. ............... | 709/233 |

OTHER PUBLICATIONS

U.S. Appl. No. 60/359,364, filed Feb. 26, 2002, by Flowers, et al. Prov.
U.S. Appl. No. 10/218,940, filed Aug. 14, 2002, by Lundburg et al,.
U.S. Appl. No. 10/218,819, filed Aug. 14, 2002 by Flowers, et al.,.

* cited by examiner

*Primary Examiner*—Duc C Ho
(74) *Attorney, Agent, or Firm*—Burns & Levinson LLP; Jerry Cohen; David Gomes

(57) ABSTRACT

Processing separate audio input packets from each connection of a telephone conference assigns audio input packets from each connection to a sequence of output periods. Each connection is then sequenced a first time during each output period for processing any input packets assigned to that output period. Each connection is then sequenced a second time during each output period for preparing a separate audio output packet for each connection.

19 Claims, 5 Drawing Sheets

TELEPHONE CONFERENCING SYSTEM AND METHOD

RELATED APPLICATIONS

The present application claims priority from U.S. provisional application Ser. No. 60/359,364, filed Feb. 25, 2002, entitled Telephone Conferencing System, Software And Method.

FIELD OF THE INVENTION

The present invention generally relates to telephone conferencing systems and particularly to the processing of digital audio sample packets used in the system.

BACKGROUND

Telephone conferencing is widely used in business to enable groups of diversely disciplined individuals to have meaningful interactive discussions, which provide understanding of inter-related issues and thereby achieve progress on complex projects without the expense, time and inconvenience of travel. Most teleconferencing systems developed to date have used audio mixing techniques which are hardware based and thereby do not provide the greater sophistication available with software based systems. Such hardware based systems typically mix all incoming audio signals which can at times provide listeners with a confusing cacophony. Signal levels between the various conference connections can be normalized to compensate for audio volume variations between participants; however, significant sophistication for controlling the contents of the resulting audio output can still be lacking. Managing teleconferences using such technology is still very dependent upon the etiquette observed by the participants. Such hardware based mixing systems are also typically costly to install and maintain, making them useable only by telephone service providers and available to business users only as a subscription service.

It is desirable in teleconferencing systems to have greater sophistication in various aspects of each teleconference and particularly in the audio mixing aspect. It is also desirable to have a software based teleconferencing system which is more affordable to business users.

SUMMARY OF THE INVENTION

It is an object of the present invention to provide a system for processing digital audio packets for teleconferencing.

It is a further object of the present invention to provide such a system in the form of software for a general purpose computer.

It is a still further object of the present invention to provide such a system which can function with sufficient speed to meet the requirements for handling numerous teleconferences between many participants.

Accordingly, one form of the present invention provides a method for processing separate audio input packets from each of one or more connections of a telephone conference having a multiplicity of connections participating therein, comprising the steps of assigning audio input packets from each connection to a sequence of output periods for sending audio output packets to all connections, first sequencing through each of the connections a first time during each output period for processing any audio input packets assigned to the respective output period, and second sequencing through each of the connections a second time during each output period for preparing a separate audio output packet for each respective connection during each respective output period based upon said processing any audio input packets in said first sequencing.

A portion of this method, including the steps of first sequencing and second sequencing may be performed by a high priority, object oriented, computing process. Further, the step of assigning and other aspects of a teleconferencing function may be performed while the steps of first sequencing and second sequencing are not being performed.

This method may be adapted for handling a plurality of telephone conferences each having a multiplicity of respective participating connections producing individual sequences of audio input packets, by separately initiating the steps of first sequencing and second sequencing during a plurality of processing intervals during each output period for handling different individual conferences during each processing interval.

In another form, the present invention is embodied in a telephone conferencing system which processes sequential audio input packets from each of one or more connections of a telephone conference having a multiplicity of connections participating therein, including processes for performing the above-mentioned method steps.

In yet another form, the present invention provides a method for handling a plurality of telephone conferences each having a multiplicity of respective participating connections producing individual sequences of audio input packets, including the step of preparing a connection-specific audio output packet for each connection of each respective conference during each one of a sequence of output periods, wherein the connection-specific audio output packets are based upon audio input packets from one or more connections of each respective conference. This preparing step is separately initiated during a plurality of processing intervals during each output period for handling different individual conferences during each processing interval. These steps of preparing and separately initiating may be performed by a high priority, object oriented, computing process and other aspects of a teleconferencing function for a plurality of teleconferences may be performed while the preparing process is not functioning.

A refinement of this method may include assigning audio input packets from each connection to the sequence of output periods for sending audio output packets to all connections, while the preparing step includes first sequencing through each of the connections a first time during each output period for processing any audio input packets assigned to the respective output period, and second sequencing through each of the connections a second time during each output period to prepare a separate audio output packet for each respective connection during each respective output period based upon processing any audio input packets in the first sequencing.

In still another form, the present invention is embodied in a telephone conferencing system, including a computer being adapted to receive digitized telephony signals from a significant number of telephone connections including telephone control signals and audio input packets, a computing process responsive to the telephone control signals and the audio input packets and being adapted to provide conferencing services to a multiplicity of conferences each having a multiplicity of connections, and a media service process within the computing process and adapted to receive all audio input packets and to create audio output packets in response to the received audio input packets, wherein the media service module includes processes for performing the above-mentioned method steps.

BRIEF DESCRIPTION OF THE DRAWINGS

The present invention is illustratively described and shown in reference to the accompanying drawings, in which.

DETAILED DESCRIPTION OF THE DRAWINGS

Figure 1:
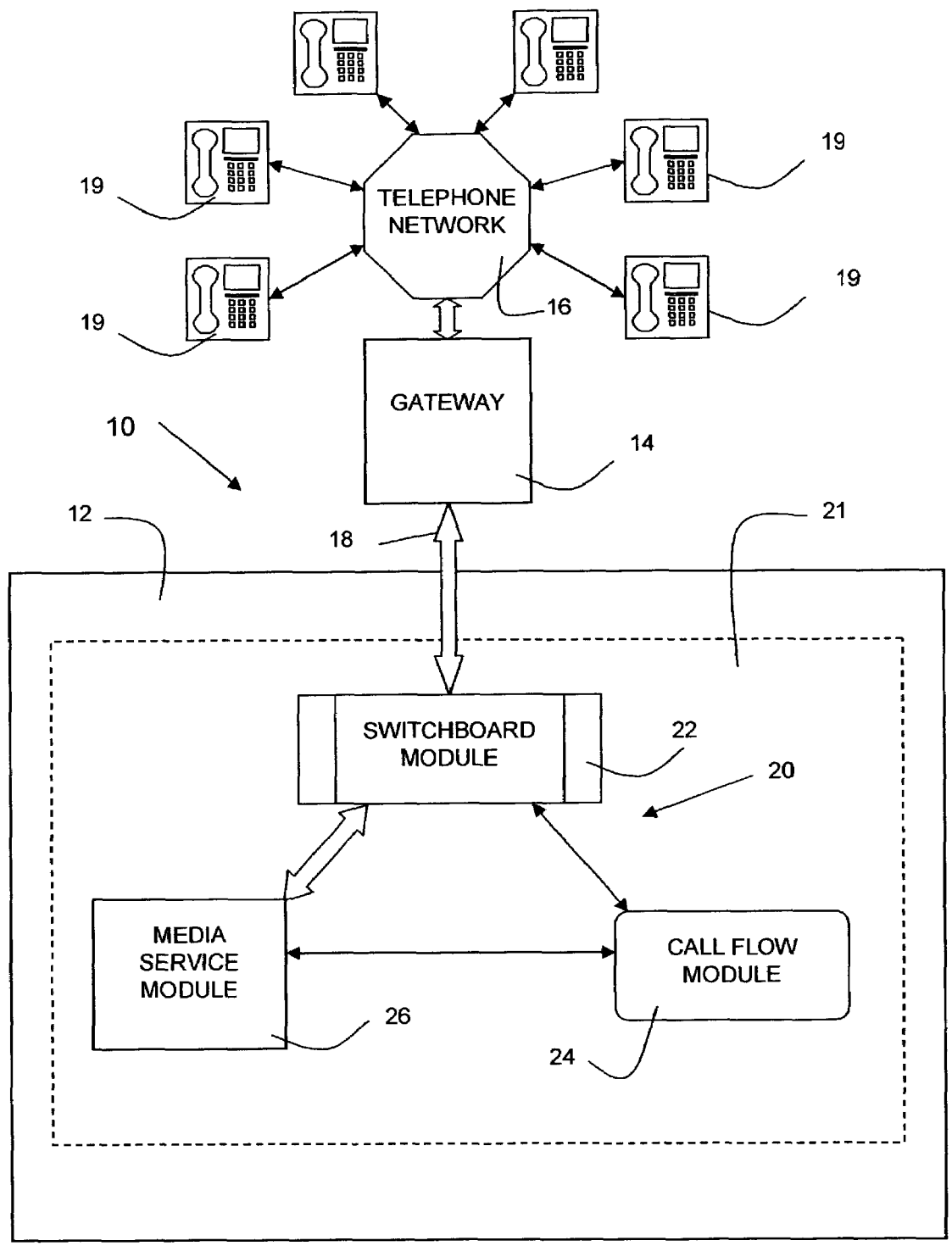
FIG. 1 is a system block diagram of a software based teleconferencing system.

The present invention for processing digital audio packets is described in the context of a software based, telephone conferencing system which digitally receives, processes, mixes and outputs, packets of audio sample values. The present invention takes various forms, the most important aspects of which are described in reference to FIGS. 2 and 4. A teleconferencing system 10 is generally shown in FIG. 1 in its simplest form and includes a computer 12 with a telephone interface or gateway card 14 to which a PSTN or other common telephony network 16 is connected. The commercially available, gateway card 14 converts common telephony signaling protocols such as ISDN/PRI and CAS into common computer format, and converts common telephony audio sample packets sent via time division multiplexing, or TDM, into audio packets that can be carried over a common computer network 18.

Computer 12 includes software 20 stored in memory 21 or any other suitable, computer readable media, which software 20 has three software modules, Switchboard module 22, Call Flow module 24, and Media Service module 26. These modules are developed for the Distributed Component Object Model, DCOM, a method for Inter-Process Communication (IPC) which runs on a Microsoft Windows operating system. In this manner, the modules may easily be run on either a single processor, separate processors or computers, or some combination there between. Interconnection between multiple computers, for the implementation of this system 10, may be accomplished with the use of a common IP switch, by methods well known in the art.

The Switchboard module 22 interfaces with the gateway card 14, to direct all signals, which may be either audio packets or a variety of telephony signals, such as an incoming call signal or a DTMF signal. Switchboard 22 directs audio packets to the Media Service module 26 and telephony signals to the Call Flow module 24. In the event that system 10 uses voice responses to control conference functions, such voice responses can be identified by the switchboard module 22 and sent to call flow module 24. Alternatively, audio packets may be routed directly between Media Service module 26 and gateway card 14 for expeditious handling.

The Call Flow module 24 manages all calls, which are defined in terms of connections and conferences, and responds to all telephony signals in the manner described in U.S. patent application entitled Method And System For Providing Audio Conferencing Services, Ser. No. 09/528,549 filed Mar. 20, 2000 and corresponding PCT Patent Application No. US01/08082 filed Mar. 14, 2001, which are hereby incorporated by reference herein.

The nature of teleconferencing systems should be keep in mind in that system 10 handles a multiplicity of incoming streams of audio input packets for multiple conferences and needs to process, mix and output, audio output packets to all connections of all conferences with minimal delay in order to provide a useful teleconferencing function. The present system is intended to handle the serial processing of all audio packets at a throughput level which keeps up with large numbers of connections. Although the present invention is described herein in the form of a computer program for a general purpose computer, portions of it may also be embodied in any suitable processing form, in hardware such as an ASIC (application specific integrated circuit), or in programmable hardware such as an FPGA (field programmable gate array).

Figure 2:
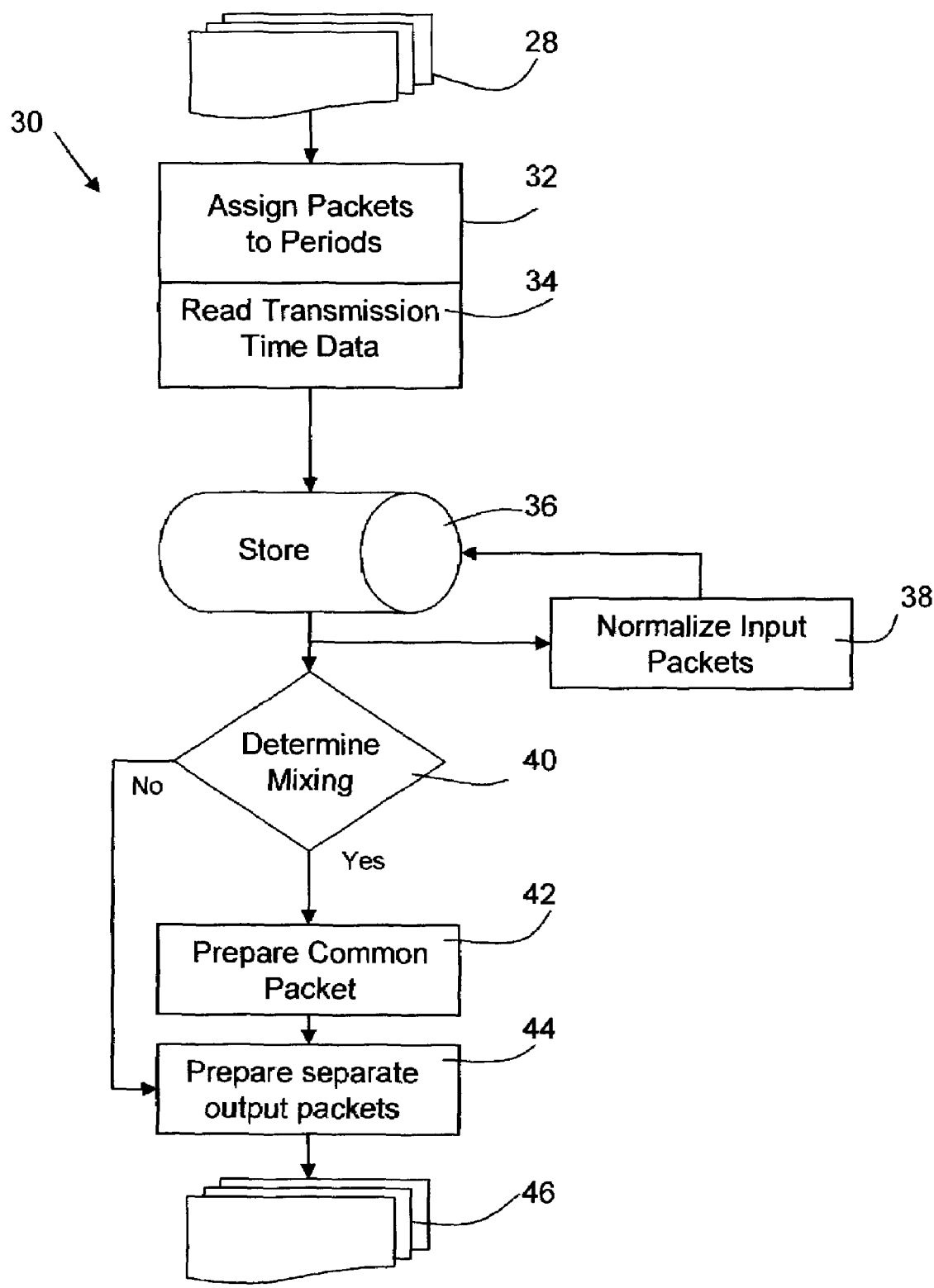
FIG. 2 is a process flow diagram of an audio packet processing system constructed in accordance with one embodiment of the present invention and suitable for use with the system of FIG. 1.

The present invention is embodied in Media Service module 26, in a processing system 30, generally shown in FIG. 2. Processing system 30 receives all of the audio input packets 28, also known as media, from all connections 19 and all conferences being handled by teleconferencing system 10. Processing system 30 generally includes an Assigning process 32, a Storing process 36, a Normalizing process 38, a Determining process 40, a first Preparing process 42 for a common packet, and a second Preparing process 44 for connection specific output packets 46.

Assigning process 32 includes steps for designating a sequence of output periods for sending audio output packets 46 to all connections 19. An included reading process 34, reads any transmission time data, or "time stamp", contained in each of the received audio input packets 28. Assigning process 32 then assigns sequential audio input packets 28 from each connection to corresponding sequential output periods in response to the transmission time data from the reading process 34. In this manner, the input packets assigned to each output period are from different connections.

The input, and output, packet size is determined by the host telephone system and is typically 20 to 30 milliseconds in length. The Media Service module 26 uses the same 20 to 30 millisecond packet size to designate the output periods for sending audio output packets back to the connections. Such input packets 28 are subject to irregular arrival times, or "jitter," due to the nature of packet based telephone networks. A predetermined amount of delay is used between receipt of the audio input packets 28 and transmission of corresponding audio output packets 46, which delay absorbs any telephone system jitter and provides time for processing the packets. Assigning process 32 can include marking each of the assigned input packets with their respective output periods. The Media Service module 26 may keep track of all of the connection-specific time stamps and output period assignments for purposes of assuring accurate packet timing and determining the loss of any packets. Lost packets can be compensated for by known techniques such as simply repeating the previous sequential packet. Packets not having a valid time stamp may be treated as damaged or lost packets.

Storing process 36 then saves the packets from each connection in a separate ring buffer, which ring buffers may be large enough to store as many as five or six packets for each connection. Storing process 36 is thus part of the buffering used to compensate for telephone system jitter and provide time for packet processing. It may also be used to help realign input packets that are received out of sequence. The sample values in the packets are stored in the format (compressed or not) in which they are received.

Normalizing process 38 includes steps for adjusting the sample values in each of the input packets to be within a very general common range, thereby providing greater compatibility for relative measurement and mixing. Normalizing process 38 generally compensates both for the various value ranges provided by the different connection-specific telephone systems participating in any conference, as well as for the range of sound levels that can be produced from a single connection. This normalizing process 38 and the automated gain control process it performs on the individual packets and sample values is described in greater detail below in reference to FIG. 3.

The Determining process 40 includes steps for determining the applicability, to each output period, of using a common audio output packet for a plurality of connections. Such applicability may be found whenever a mere plurality, or two or more connections will receive the same common output packet during an output period. Optionally, the minimum number of connections required for applicability of a common output packet may be higher.

The first Preparing process 42 includes steps for preparing a common audio output packet by mixing normalized audio input packets from one or more connections, for each output period where a common audio output packet is applicable.

The second Preparing process 44 includes steps for preparing a separate audio output packet 46 specifically for each connection during each output period including use of a respective common audio output packet where applicable.

Figure 4:
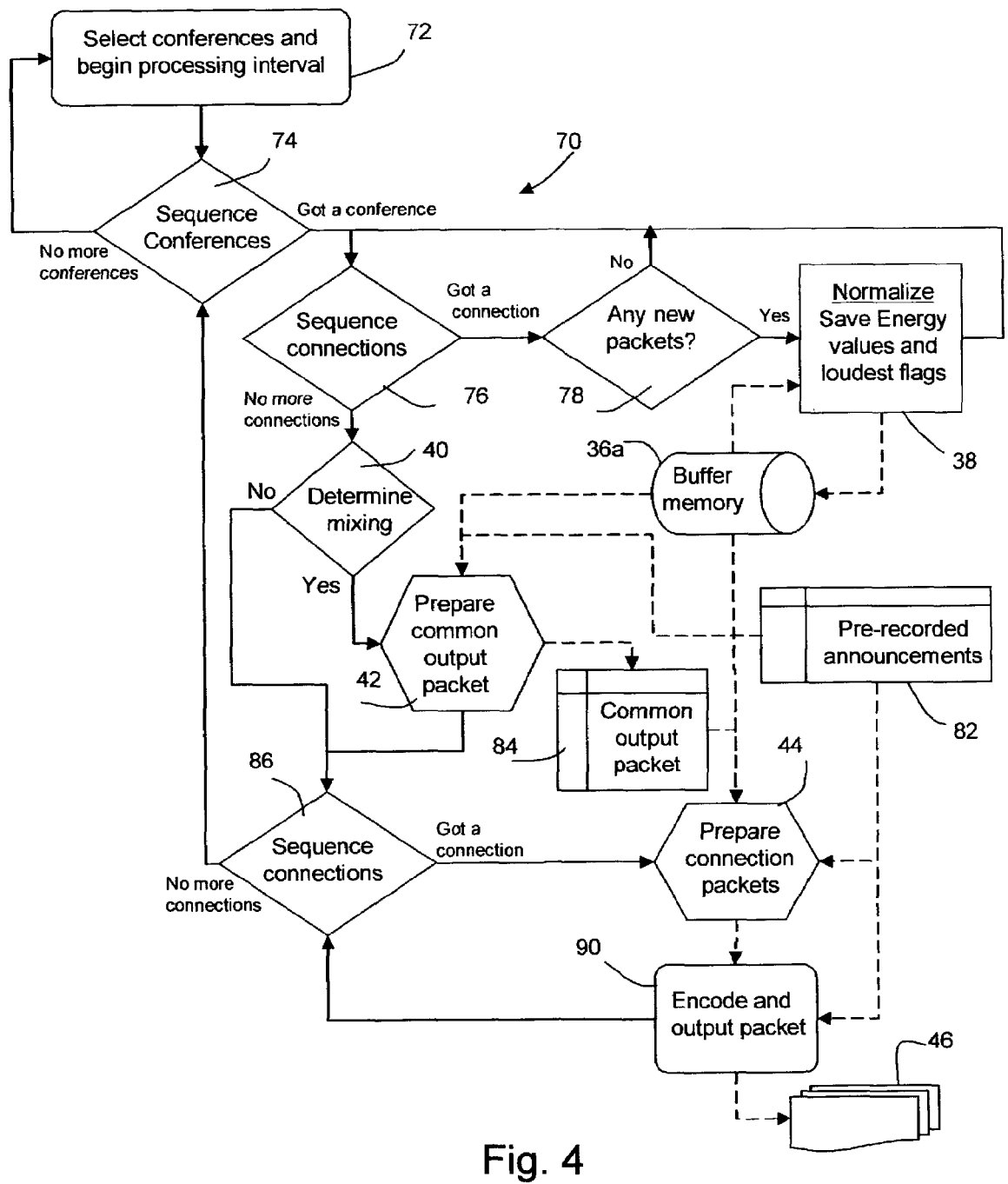
FIG. 4 is a more detailed process flow diagram of portions of the processing system of FIG. 2.

The processes of Determining 40, Preparing a common packet 42 and Preparing output packets 44 are described in greater detail in reference to FIG. 4

Figure 3:
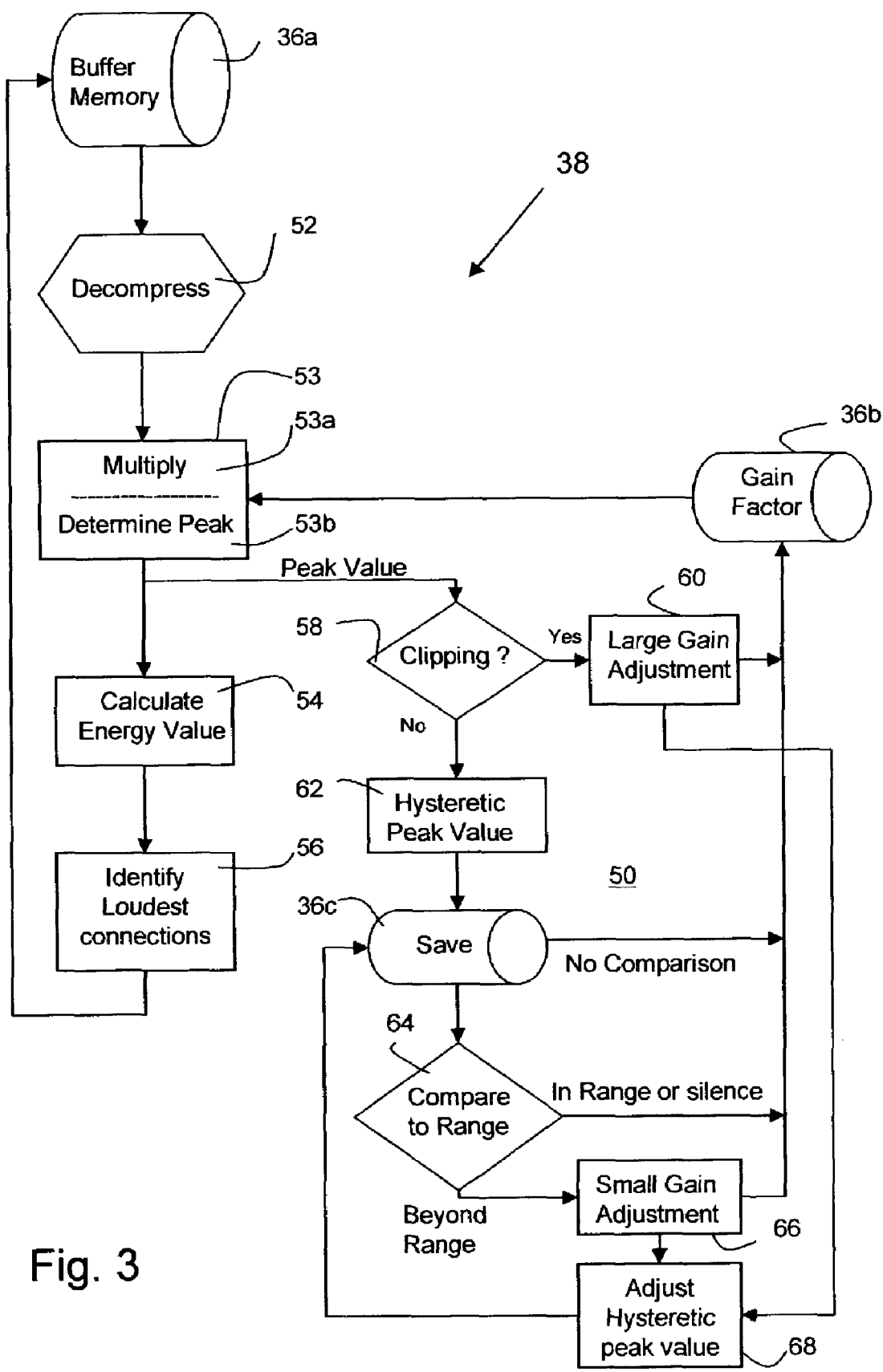
FIG. 3 is a process flow diagram of an audio gain control system suitable for use in the processing system of FIG. 2.

FIG. 3 shows normalizing process 38 including an audio gain control processing system 50. The audio input packets 28 that have been stored by Storing process 36 are first retrieved from a buffer memory 36a. As mentioned, these packets have been stored as received and have not necessarily been decoded. They are therefore decoded by a decompression process 52, as needed. This typically means the G.711 CODEC packets are decompressed to a linear format. In one embodiment, all coding and decoding is performed with a look-up table process.

As mentioned, Normalizing process 38 includes steps for adjusting the sample values in each of the input packets 28 to be within a very general common range. This is done by multiplying process 53 using a previously determined, connection specific, gain factor 36b. This multiplication enables a determination in process 54 of a relative packet "energy" value for each packet. In one embodiment, the relative energy value of each packet is calculated by adding together all of the sample values within the packet.

Identification process 56 then uses these determined relative energy values to identify a predetermined number of "loudest" connections for each designated output period by comparing the determined relative energy values of the input packets assigned to each output period. The actual comparison is performed on a running basis as each energy value is calculated. A flag is used to identify each loudest talker, and any new detection of a loudest talker causes each of the flags for previously identified loudest talkers to be changed accordingly. The normalized audio input packets are then re-stored in buffer memory 36a.

Gain Control system 50 is designed to determine gain factors for a sequential multiplicity of audio sample packets based upon sequentially processing each packet as a present packet. The functioning of gain control system 50 is based upon a highest sample value, or peak value, in each audio input packet from respective connections. The peak value is determined in multiplying process 53 by a processing step 53a for multiplying all sample values within each audio input packet by a previously determined gain factor and by a processing step 53b for determining the highest sample value within each packet. In a preferred embodiment, these steps are performed in the order described, but that order might be reversed without necessarily affecting gain control system 50. The steps 53a and 53b thereby determine a comparison peak value in which the highest sample value from the present packet is multiplied by the previously determined gain factor. The comparison peak value is so-called as it is used for comparison in the gain control process. The previously determined gain factor, used in multiplying process 53a, was set from a previously processed, connection-specific packet and was stored in memory 36b for use with the present packet. A predetermined, low average gain factor is used in the absence of a previously determined connection-specific gain factor The comparison peak value is sent to a first comparison process 58 which determines the presence of clipping by comparing the comparison peak value against a predetermined maximum value. In the presence of clipping, a signal is sent to an adjustment process 60 which determines a new gain factor by lowering the predetermined gain factor, used for the present packet, by a substantial, predetermined amount. The new gain factor is then stored in memory 36b for use with subsequently processed, connection-specific input packets. In one embodiment, the gain factor takes the form of a percentage value, wherein normal adjustments are made by single percentage points and major adjustments, as in the presence of clipping, are made at a rate of ten percentage points. When clipping is not present, adjustment process 60 is not used.

A process 62 to determine a present packet hysteretic peak value uses the comparison peak value and a previously determined hysteretic peak value for a prior packet. The term "hysteretic" is used herein to describe a value calculated from both the measured present packet and previous packets. The present packet hysteretic peak value is calculated by adding a fraction of the present packet comparison peak value to the complementary fraction of the previous packet hysteretic peak value, the formula for which is:

$$Hys_n = [M_n * \alpha] + [Hys_{n-1} * (1-\alpha)]$$

Where: $Hys_n$ is the hysteretic peak value being calculated for the present packet;

$M_n$ is the comparison peak value for the present packet;

$Hys_{n-1}$ is the calculated hysteretic peak value for the previous, connection-specific packet; and $\alpha$ is a fractional or percentage value potentially ranging from zero to one.

The $\alpha$ fraction for each calculation may be varied in response to different comparison peak value conditions. If the comparison peak value is higher than the calculated previous packet hysteretic peak value, a higher $\alpha$ fraction (i.e. "1.0") can be used to thereby raise the present packet calculated hysteretic value more quickly by including less historic value. This will have the ultimate effect of lowering the gain factor more quickly. When the present packet comparison peak value is lower than the previous packet hysteretic peak value, a much lower $\alpha$ fraction (i.e. "0.005") can be used to include more historic value in the calculated present packet hysteretic peak value. This will have the ultimate effect of raising the gain factor more slowly and thereby minimizing sudden loud surges in a person's voice signal. Once calculated, the present packet hysteretic peak value is stored in memory 36c relative to its respective packet and connection.

The present packet hysteretic peak value is used to determine a new gain factor for use with one or more subsequently processed packets by a comparison against predetermined minimum and maximum range values in comparison process 64. Comparison process 64 also compares the present packet hysteretic peak value against a lower silence threshold value to determine the presence of silence. If this present packet hysteretic peak value is either between the predetermined minimum and maximum range values or below the silence threshold value, the new gain factor is set equal to the previously determined gain factor. If the present packet hysteretic peak value is neither below the silence threshold value nor between the minimum and maximum range values, a responsive small gain adjustment is made in process 66.

The small gain adjustment of process 66 is made in a predetermined amount, such as a single percentage point in the example described above for detected clipping. This small gain adjustment is responsive to the comparing of the present packet hysteretic peak value in that the direction of the adjustment moves the hysteretic peak value towards the range defined by the minimum and maximum values. All new gain factors are stored in memory 36b.

Comparison process 64 is performed on a periodic basis and typically once for every predetermined number of packets. In one example, with audio packets of 20 milliseconds, comparison process 64 is performed on every fifth sequential audio packet or 10 times per second. Whenever the hysteretic peak value receives no comparison, gain control processing system 50 returns to gain factor memory 36b to leave the gain factor unchanged for the next sequential, connection-specific audio packet, after saving the calculated hysteretic peak value.

In the event of any gain factor adjustment, including Large Gain Adjustment process 60, the present packet hysteretic peak value is correspondingly changed by an adjustment process 68 and the new value is saved in memory 36c for use with future, connection-specific packets.

FIG. 4 depicts further details of the present invention including details of the remainder of the mixing process 30 of FIG. 2. FIG. 4 depicts Determining process 40, preparing process 42 and Preparing process 44, along with the overall sequencing of those processes and Normalizing process 38. In particular, FIG. 4 shows the process 70 used by a software embodiment of the present invention. For purposes of clarity, sequence flow is represented by solid lines and the flow of audio packet data is represented by dashed lines. Process 70 represents the processing which takes place after the first Storing process 36 of FIG. 2. Up to this point, input audio packets have been received and assigned to respective output periods. The remaining processing, including Normalizing process of FIG. 3, is all sequenced based upon the assigned output period of each stored audio input packet for the purpose of minimizing the amount of per connection mixing and thereby enhancing system performance. The system performance is enhanced to the point where the processing-intensive packet manipulation, along with all other teleconferencing functions for a system with a useful capacity, can be performed by a single processor.

Process 70 is initiated in FIG. 4 by a control process 72 which determines the start of processing for each sequential output period. This is followed by a sequencing process 74 which enumerates and sequences through all active conferences, thus enabling system 30 to handle multiple conferences at the same time. In one embodiment, the servicing of multiple conferences is accomplished by dividing those conferences between a plurality of processing intervals distributed over each output period. In this case, control process 72 initiates each processing interval and either identifies the conferences to be processed during each interval or else identifies the interval, the conference assignment for which is already known by process 70.

For each sequentially enumerated conference, a sequencing process 76 enumerates and sequences through each of the connections a first time for the purpose of processing audio input packets by Normalizing process 38. This processing is enhanced by a decision process 78, which first looks for any newly received input packet from that connection and assigned to the present output period. Normalizing process 38 is then performed on any such newly received input packet. Energy values from process 54 of FIG. 3 and the determined loudest connection flags from process 56 of FIG. 3 are stored by Normalizing process 38 in buffer memory 36a.

Once process 76 has sequenced through all connections for a given conference in a given processing interval, process 70 moves to determining process 40, which determines the applicability of using a common output packet for two or more connections for that respective output period. The criteria used for determining applicability and preparing a common audio output packet may be as simple as whether two or more connections will receive the same mixture from other connections. Using this minimal criteria as an example, the number of connections is first determined. Then the number of connections receiving an overlaid announcement is subtracted from the total number of connections. Overlaid announcements are typically connection specific and necessarily exclude any talker content from the other connections. Next, the number of loudest talkers intended for the premix are subtracted from the first result, because they should not hear their own voice for purposes of clarity. If the number of connections remaining is two or more, the decision is made to prepare a common output packet at Preparing process 42. If a common audio output packet is not applicable to any specific output period, process 70 proceeds to sequencing process 86 and Preparing process 44.

For further explanation of this premixing decision, some examples are described. In the case of a lecture conference, there would likely be only one talker and many listeners, so a common audio output packet from just the lecturer would be used during most of the conference. In the case of a three person conference where more interaction is expected, use of a common audio output packet would vary greatly. In larger conferences, a common audio output packet would typically always be used. The present system could also handle a simple conversation between two callers without the use of a common audio output packet.

Preparing a common audio output packet is performed for the purpose of minimizing the amount of per connection mixing. The premixed common packet is prepared at process 42 just like all mixed packets, by adding the chronologically, or sequentially corresponding sample values from two or more packets intended for the same output period. The specific packets used for the premix depend upon the determination of the loudest talkers as stored in buffer memory 36a and the use of any conference wide announcements as determined by call flow module 24. All pre-recorded announcements are stored in a memory 82. In one embodiment, the number of loudest talkers used is three; however, fewer than three participants may actually be talking at any one time. For this reason, the common audio output packet may include less than three, or even zero, talkers, with or without a conference wide announcement. Thus, preparing a common audio output packet may not require actual mixing, if it is just a single connection input packet or a single announcement packet.

Once the common audio output packet 84 is prepared, process 70 moves to sequencing process 86, where the connections are individually sequenced a second time, and preparing process 44 mixes separate output audio packets 46 with specific content for each connection. Where a respective common audio output packet is applicable to that output period and conference, the content of an output packet 46 may include the common output packet 84 and optionally any connection-specific announcement from memory 82. Any conference-wide announcements would already be in the common output packet. The content of an output packet 46 may alternatively include any overlaid announcement from memory 82. For the determined loudest talkers, the content of an output packet may include a mix of the other loudest talkers from buffer memory 36*a*, and may optionally be mixed with any conference-wide and/or connection-specific announcements from memory 82.

It is during the connection specific preparing process 44 that an overall sample level, or volume control may be applied to the samples in each audio output packet 46. This volume control function may be active and originate from the Call Flow module. The relative volume of the speaker voices, conference wide announcements, and connection specific announcements can be varied. It might thereby be used to temporarily lower the volume of the speaker voices to better distinguish an announcement.

The connection-specific output packets created are converted to a telephony standard format, such as G.711, at process block 90 and time-stamped for playback in accordance with telephony standards. The converted packets 46 are then transmitted to their respective connections through switchboard module 22. As noted, all standard announcements are stored in memory 82 in coded form for direct telephony transmission. For connections receiving such announcements in the overlaid mode, or otherwise at the exclusion of other audio, the stored announcement packets may simply be time stamped and transmitted. Where these standard announcements need to be mixed to any extent, they are read from memory and decoded just prior to mixing. In one embodiment, all coding and decoding is performed with a look-up table.

Once sequence process 86 has sequenced through all of the connections for a conference, process 70 returns to sequence process 74 which then proceeds with the next conference assigned to the present processing interval. Once all conferences for the present interval have been handled, process 70 returns to control process 72 to await the start of the next processing interval.

Figure 5:
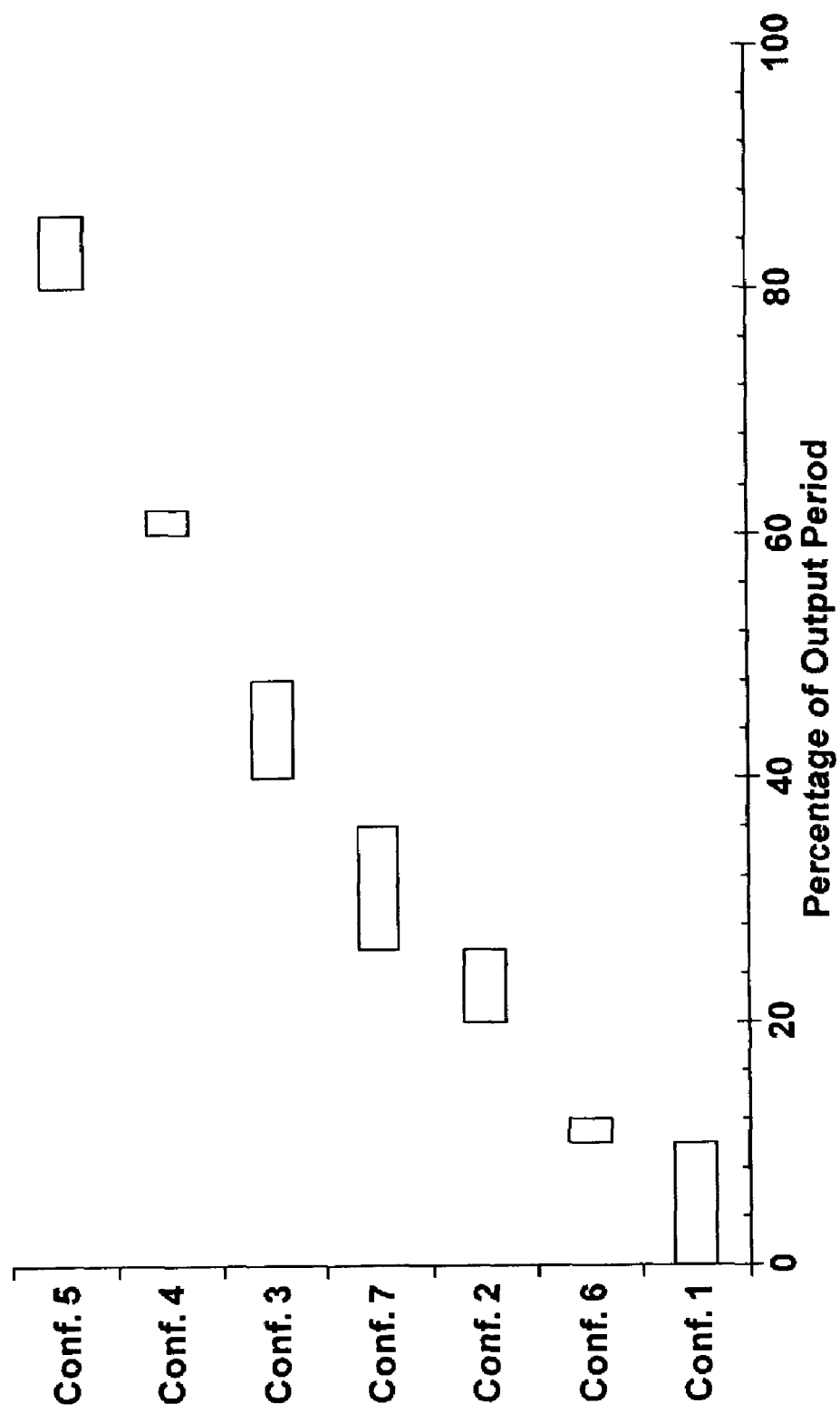
FIG. 5 is a timing diagram depicting a processing plan for the system of FIGS. 2 and 4.

FIG. 5 shows a nominal example of the timing of processing that might be performed by process 70 in a teleconferencing system handling seven conferences with a multiplicity of connections for each conference. A nominal scale and a nominal number of conferences are shown for purposes of clarity. The horizontal axis represents the time line of a typical output period, which timeline would be repeated for every output period. The scale is chosen to simply represent the whole (100%) output period. The output period is divided into five processing intervals at each of the percentage marks divisible by twenty percent. As conferences are started they are assigned to sequential processing intervals so conference #1 is processed in the first interval, conference #2 in the second and so on until the first five conferences are evenly distributed among the intervals. When the sixth and seventh conferences are started they are added to the respective first and second intervals.

The bars on the chart of FIG. 5 show the time periods during which process 70 is servicing the respective conferences listed in the left column. In this manner, conference #6 is processed right after conference #1, but then process 70 goes inactive until the start of the second processing interval and the servicing of conference #2. Likewise process 70 is idle between the servicing of conferences #7 and #3, and likewise between conferences #3 and #4, #4 and #5, and #5 and #1 (in the next output period). It is during these idle times for process 70 that all of the remaining teleconferencing functions can be performed by system 10, including the assigning process 32 and storing process 36 of FIG. 2, as well as all of the functions of the switchboard module 22, and call flow module 24 of FIG. 1.

In the preferred embodiment, there are many more processing intervals (typically twenty to thirty) and many more conferences (hundreds). The easiest implementation is to divide the output period by a standard clock interval, such as a millisecond, and thereby fill the output period with as many processing intervals as there are milliseconds. Thus the typical telephone system, which uses audio packets of twenty to thirty milliseconds, would have approximately that same number of processing intervals. The many more conferences handled in this situation would likewise be distributed over the output period on some basis, such as number of conferences or number of connections. In spite of these greater numbers, there are still idle periods for process 70 during which other teleconferencing functions would be performed.

In the event that process 70 does not finish all conferences assigned to a processing interval, this high priority processing simply continues until process 70 catches up. In cases of extreme overload, where process 70 cannot keep up over the entire output period, the unprocessed packets for an expired output period can be dropped to remove the delay. In one embodiment, actual conference and connection processing can run behind the assigned output period. Where the processing delay reaches the length of a full packet, the system can skip an entire, system-wide output period to catch up.

The overall processing scheme of the present system thus allows the distribution of the processing-intensive manipulation of the media packets. This distributed processing thereby distributes the outputting of media packets by switchboard module 22 and the system 10. This combined distribution significantly enhances system performance by allowing for the timely performance of all teleconferencing functions by a single processor. It also enhances performance when multiple processors or computers are used.

The specific embodiments of the present invention described above are intended to be taken in an illustrative and not a limiting sense. Various modifications and changes may be made to the above embodiments by practitioners skilled in the art, without departing from the scope of the present invention as defined in the appended claims.

What is claimed is:

1. A method for processing separate audio input packets from each of one or more connections of a telephone conference having a multiplicity of connections participating therein, comprising the steps of:
   assigning audio input packets from each connection to a sequence of respective output periods for sending audio output packets to all connections;
   first sequencing through each of the connections a first time during each respective output period for processing any audio input packets assigned to the respective output period; and
   second sequencing through each of the connections a second time during each respective output period for preparing a separate audio output packet for each respective connection during each respective output period based upon said processing any audio input packets in said first sequencing.

2. The method of claim 1, further comprising the steps of: determining the applicability to each respective output period of using a common audio output packet for a plurality of connections; and preparing a respective common audio output packet for each said respective output period where a common audio output packet is applicable, based upon said processing any audio input packets in said first sequencing, wherein said second sequencing through each of the connections a second time during each respective output period for preparing a separate output packet includes using said respective common audio output packet, where applicable.

3. The method of claim 2, wherein said step of first sequencing through each of the connections a first time during each respective output period includes normalizing audio input packets assigned to each respective output period to create normalized audio input packets and identifying a plurality of loudest connections for each respective output period based upon said normalized audio input packets; and further wherein said step of preparing a respective common audio output packet includes mixing said normalized input audio packets from said plurality of loudest connections for each respective output period.

4. The method of claim 1, wherein said steps of first sequencing and second sequencing are performed by a high priority, object oriented, process implemented as computer readable code embodied in a computer readable medium.

5. The method of claim 1, further comprising performing said step of assigning and other aspects of a teleconferencing function while the steps of first sequencing and second sequencing are not being performed.

6. The method of claim 1 adapted for handling a plurality of telephone conferences each having a multiplicity of respective participating connections producing individual sequences of audio input packets, further comprising separately initiating said steps of first sequencing and second sequencing for each of the plurality of telephone conferences during a predetermined one of a plurality of processing intervals within each output period for handling different individual conferences during each processing interval.

7. A telephone conferencing system which processes sequential audio input packets from each of one or more connections of a telephone conference having a multiplicity of connections participating therein, comprising:

an assigning process for assigning separate audio input packets from each connection to a sequence of respective output periods for sending audio output packets to all connections;

a first sequencing process for sequencing through each of the connections a first time during each respective output period for processing any audio input packets assigned to the respective output period; and a determining process for determining the applicability to each respective output period of using a common audio output packet for a plurality of connections;

a preparing process for preparing a respective common audio output packet based upon said processing any audio input packets in said first sequencing, for each output period where a common audio output packet is applicable;

a second sequencing process for sequencing through each of the connections a second time during each respective output period for preparing a separate audio output packet for each respective connection, including using said respective common audio output packet, where applicable.

8. The system of claim 7, wherein said first sequencing process, second sequencing process, determining process and preparing process are implemented in high priority, object oriented, computer code stored in a computer readable medium.

9. The system of claim 7, wherein said first sequencing process includes a normalizing process for normalizing audio input packets assigned to each respective output period to create normalized audio input packets and an identifying process for identifying a plurality of loudest connections for each respective output period; and further wherein said preparing process for preparing a common audio output packet includes mixing said normalized input audio packets from said plurality of loudest connections for each respective output period.

10. The system of claim 9, wherein said second sequencing process includes:

a second preparing process for preparing an audio output packet for each said loudest connection of a respective output period, by mixing said normalized audio input packets from any other said loudest connections identified for the respective output period; and a third preparing process for preparing an audio output packet, for connections not identified as loudest connections for the respective output period, using one or more selections from the group of said respective common audio output packet, a conference wide announcement, and a connection specific announcement.

11. The system of claim 9, wherein said normalizing process includes:

a multiplying process for multiplying sample values within each audio input packet by a gain factor, and a second determining process for determining a packet energy value for each said audio input packet based upon the multiplied sample values, and further wherein said identifying process is responsive to determined packet energy values.

12. A method for handling a plurality of respective telephone conferences each having a multiplicity of respective participating connections producing individual sequences of audio input packets, comprising the steps of:

preparing a connection-specific audio output packet for each connection of the multiplicity of respective participating connections of each respective conference of the plurality of telephone conferences during each one of a sequence of respective output periods, wherein said connection-specific audio output packets are based upon audio input packets from one or more connections of the multiplicity of respective participating connections of each respective conference; and separately initiating said preparing step for each respective conference during a predetermined one of a plurality of processing intervals within each output period for handling different individual conferences during each processing interval of the plurality of processing intervals.

13. The method of claim 12, wherein said steps of preparing and separately initiating are performed by a high priority, object oriented, process implemented as computer readable code embodied in a computer readable medium.

14. The method of claim 12, further comprising processing other aspects of a teleconferencing function for the plurality of telephone conferences while the preparing process is not functioning.

15. The method of claim 12, further comprising assigning audio input packets from each connection to said sequence of respective output periods for each respective conference;
wherein said preparing step includes first sequencing through each connection for each respective conference a first time during each respective output period for processing any audio input packets assigned to the respective output period, and second sequencing through each connection for each respective conference a second time during each respective output period to prepare a separate audio output packet for each connection during each respective output period based upon said processing any audio input packets in said first sequencing.

16. The method of claim 12, further comprising the steps of:
determining the applicability to each respective output period for each respective conference of using a common audio output packet for a plurality of respective participating connections; and
preparing a respective common audio output packet for each said output period and respective conference where a common audio output packet is applicable, based upon said processing any audio input packets in said first sequencing,
wherein said second sequencing through each of the connections a second time during each output period for preparing a separate output packet includes using said respective common audio output packet, where applicable.

17. A telephone conferencing system, comprising:
a computer being adapted to receive digitized telephony signals from a significant number of telephone connections including telephone control signals and audio input packets;
a computing process implemented in computer code embodied in a medium readable by the computer, said computing process being adapted to be responsive to the telephone control signals and the audio input packets and to provide conferencing services for a multiplicity of conferences each having a multiplicity of telephone connections; and
a media service process module within the computing process and adapted to receive all audio input packets and to create audio output packets for each telephone connection of the multiplicity of telephone connections for each conference of the multiplicity of conferences in response to the received audio input packets,
wherein the media service process module includes:
an assigning process for assigning audio input packets from each connection to a sequence of output periods for sending separate audio output packets to each telephone connection of the multiplicity of conferences;
a sequencing process for sequencing through each telephone connection a first time during each output period for processing any audio input packets assigned to each respective output period;
a preparing process for preparing a connection-specific audio output packet for each telephone connection of each respective conference during each one of said output periods, based upon said processing of audio input packets in said sequencing process, from one or more connections of each respective conference; and
a timing process for separately initiating said sequencing and preparing processes during a predetermined one of a plurality of processing intervals within each output period for handling different individual conferences during each processing interval.

18. The system of claim 17, wherein said sequencing process, said preparing process and said timing process are performed by a high priority, object oriented software thread within the computer code, and further wherein said computing process and said media service process are adapted to perform said assigning process and other teleconferencing functions while said high priority, object oriented software thread is not functioning.

19. The system of claim 18, wherein said high priority, object oriented software thread further includes
a determining process for determining the applicability to each said output period for each respective conference of using a common audio output packet for a plurality of connections for each respective conference, and
a second preparing process for preparing a respective common audio output packet for each conference and each said output period where a common audio output packet is applicable, based upon said processing any audio input packets in said sequencing process;
and further wherein the first said preparing process uses said respective common audio output packet, where applicable.

* * * * *